US 8,880,752 B2

(12) United States Patent
Hess (10) Patent No.: US 8,880,752 B2
(45) Date of Patent: Nov. 4, 2014

(54) CUSTOMIZING AND/OR MULTIPLEXING UNIVERSAL SERIAL BUS PINS

(75) Inventor: David M. Hess, McHenry, IL (US)

(73) Assignee: Motorola Mobility LLC, Libertyville, IL (US)

(*) Notice: Subject to any disclaimer, the term of this patent is extended or adjusted under 35 U.S.C. 154(b) by 19 days.

(21) Appl. No.: 13/327,134

(22) Filed: Dec. 15, 2011

(65) Prior Publication Data

US 2013/0159559 A1    Jun. 20, 2013

(51) Int. Cl.
*G06F 3/00* (2006.01)
*G06F 13/00* (2006.01)
*G06F 15/177* (2006.01)

(52) U.S. Cl.
USPC ............... 710/14; 710/8; 710/11; 711/170; 713/1; 713/2

(58) Field of Classification Search
None
See application file for complete search history.

(56) References Cited

U.S. PATENT DOCUMENTS

| 7,673,080 | B1* | 3/2010 | Yu et al. ............... 710/62 |
| 7,844,763 | B2* | 11/2010 | Yu et al. ............... 710/62 |
| 7,865,629 | B1 | 1/2011 | Tantos et al. |
| 2006/0052072 | A1 | 3/2006 | Hess et al. |
| 2008/0150512 | A1* | 6/2008 | Kawano ............... 323/351 |
| 2008/0276114 | A1* | 11/2008 | Ohie et al. ............ 713/500 |
| 2009/0228614 | A1* | 9/2009 | Hwang ............... 710/16 |
| 2009/0307679 | A1 | 12/2009 | Lee et al. |
| 2010/0049878 | A1* | 2/2010 | Yu et al. ............... 710/11 |
| 2011/0126005 | A1* | 5/2011 | Carpenter et al. ........ 713/158 |
| 2012/0131353 | A1 | 5/2012 | Nasir et al. |
| 2012/0254638 | A1* | 10/2012 | Kawano ............... 713/300 |

FOREIGN PATENT DOCUMENTS

WO    2011028388 A1    3/2011

OTHER PUBLICATIONS

General Editor: Scott Davis, EMU Bus, Enhanced Mini/Micro-USB Hardware Interface for Motorola Phones, and Accessories, Release 2.2, Feb. 22, 2007, pp. 11-21.
Patent Cooperation Treaty, International Search Report and Written Opinion of the International Searching Authority for International Application No. PCT/US2012/069127, Mar. 7, 2013, 15 pages.

* cited by examiner

*Primary Examiner* — Michael Sun
(74) *Attorney, Agent, or Firm* — Leydig, Voit & Mayer, Ltd.

(57) ABSTRACT

A method performed in an electronic device that connects via a USB connector to an accessory that supports multiple different operating modes. The method comprises: in response to successful authentication of the accessory after an initial connection, configuring an accessory usage setting of the electronic device to correspond to the accessory's default operational mode. In response to a request to change the operational mode of the accessory to a second operational mode: communicating to the accessory, over the signal/communication lines of the USB, mode identifying information corresponding to the second operational mode; generating a voltage level change on an ID line of the USB connector to communicate to the accessory that a change in the accessory's present operational mode is being triggered, where the accessory is designed to change to the second operational mode when a pulse or voltage level change is detected on the ID line.

20 Claims, 8 Drawing Sheets

ACCESSORY OP. MODES 197

810 Supported OP. Modes

| 0 | 0 | ... | 0 | 1 |
| 0 | 0 | ... | 1 | 1 |
| 0 | 1 | ... | 1 | 1 |
| 0 | 0 | ... | 0 | 1 |
| 1 | 1 | ... | 1 | 1 |
| 0 | 0 | ... | 0 | 0 |

805 CID

| 0 | 0 | ... | 0 | 1 |
| 0 | 0 | ... | 1 | 1 |
| 0 | 0 | ... | 1 | 1 |

FIG. 7

OP. MODE ID AND SUPPORTED FUNCTIONALITY TABLE 190

720 Supported Functions

| 0 | 0 | ... | 1 | 1 |
| 0 | 0 | ... | 0 | 0 |
| 1 | 0 | ... | 1 | 1 |
| 0 | 0 | ... | 0 | 0 |
| 0 | 1 | ... | 1 | 1 |
| 0 | 1 | ... | 1 | 1 |
| 0 | 0 | ... | 0 | 0 |
| 1 | 1 | ... | 1 | 1 |

715 Bit Value

| 0 | 0 | ... | 0 | 1 |
| 0 | 0 | ... | 1 | 1 |
| 0 | 0 | ... | 1 | 1 |

710 Mode

| 0 | 1 | ... | N-2 | N-1 |

705 Available

| 1 | 1 | ... | 0 | 1 |

Fig. 9

CUSTOMIZING AND/OR MULTIPLEXING UNIVERSAL SERIAL BUS PINS

CROSS REFERENCE TO RELATED APPLICATIONS

This application is related to co-owned U.S. patent application Ser. No. 13/276, 339, entitled SECURE DEVICE IDENTIFICATION PROTOCOL WITH AUTONOMOUS DETERMINATION OF SPECIFIC CLASS AND CAPABILITITES OF AN ELECTRONIC DEVICE CRADLE CONNECTED TO AN ELECTRONIC DEVICE.

BACKGROUND

1. Technical Field

The present disclosure relates in general to electronic devices and in particular to configuration of an accessory that is connected to an electronic device via a universal serial bus (USB) connector.

2. Description of the Related Art

Cradles for docking of smart phones are a generally known accessory. There are a variety of different types of cradles, and each cradle can typically provide and/or support a plurality of different functions that are typically extensions of the functions provided by the particular phone connected to the cradle. Conventional implementations of these smart phones and the cradles and/or accessories to which these phones are connected provide a mini/micro universal serial bus (USB) connector for connecting the two devices to each other. With the phones and devices across vendors having similar connection mechanisms, vendors occasionally also implement security mechanisms to prevent their phones from being utilized with an incorrect and/or unlicensed and/or unapproved accessory. Traditionally, the functions and/or features available via the use of a USB connection mechanism is restricted and/or limited by the small number of available signal lines supported by the connection mechanism and the corresponding micro/micro USB protocol.

BRIEF DESCRIPTION OF THE DRAWINGS

The described embodiments are to be read in conjunction with the accompanying drawings, wherein.

DETAILED DESCRIPTION

The illustrative embodiments provide an electronic device which comprises: a processor; a USB connector coupled to the processor that operates as a connecting and communication port to enable connection of the mobile phone to a universal serial bus (USB) receiving connector of an accessory device; and a memory component coupled to the processor and having stored thereon data identifying one or more alternate operational modes that can be utilized with a USB-connected accessory device. The device further comprises an accessory authentication mechanism including configuration and operational mode selection (COMS) logic. In response to detection of a physical coupling of the USB connector of the device with a USB receiving connector of an accessory device, the COMS logic: initiates an authentication and configuration protocol on the electronic device to authenticate the accessory; receives, on one or more signal and communication lines established over a USB connection between the electronic device and accessory, types of information that identify to the electronic device one or more alternate operational modes of the accessory corresponding to one or more functional features of the accessory; and sets the accessory to a first operating mode following successful authentication of the accessory. Further, in response to a request to change an operational mode of the accessory to a second operational mode among the one or more alternate operational modes, the COMS logic: generates a voltage level change on a first signal line of the USB pins of the electronic device's USB connector to communicate to the accessory that a change in a present operational mode of the accessory is being initiated; and modifies an accessory usage setting of the electronic device, relative to functional operation of the accessory when the accessory is in the second operational mode, to enable the electronic device to utilize one or more functional features associated with the second operational mode of the accessory.

One or more of the embodiments further provides a method for performing the above functional features. An embodiment of the method generally comprises: in response to successful authentication of the accessory, configuring an accessory usage setting of the electronic device to correspond to the accessory's default operational mode. In response to a request to change the operational mode of the accessory to an alternate operational mode: communicating to the accessory, over the signal/communication lines of the USB, mode identifying information corresponding to the alternate operational mode; generating one of a pulse and a voltage level on an ID line of the USB connector to communicate to the accessory that a change in the accessory's present operational mode is being triggered, where the accessory is designed to change to the second operational mode when a voltage level change is detected on the ID line. Prior to configuring the accessory usage setting of the electronic device, the embodiment of the method comprises instantiating an authentication and configuration protocol on the electronic device to authenticate the accessory; and receiving, via signal and communication lines established via connection of pins of the device USB connector to a USB connector of the accessory, one or more types of information that identifies to the electronic device the one or more alternate operational modes of the accessory corresponding to one or more functional features of the accessory.

Also, the illustrative embodiments further provide an accessory, such as a cradle, for connecting to and use with an electronic device. The cradle can operate in at least two different operational modes, a default operational mode and an alternate operational mode, and the cradle supports the above method processes of the electronic device.

Aspects of the above described embodiments relate to use of an enhanced micro/mini USB (EMU) connector, as the mechanism for connecting the accessory to the electronic device. In the various described embodiments, reference is made to the electronic device as a mobile phone and to the accessory as a mobile phone dock or cradle. In this context, it is appreciated that a mobile phone needs to uniquely identify a dock and the features supported and/or provided by the dock. With only the USB connector being used, aspects of the present disclosure enable additional functions and/or features to be overlaid on the USB connector interface, not interfere with normal operation, and allow the interface to be secure (i.e., by requiring authentication of the accessory). The disclosure assumes that the EMU connection already muxes audio and accessory ID over the USB D+, D−, and ID lines. In one embodiment, the complexity and layers of muxing is further extended on those lines. Aspects of the described method also retain backwards compatibility.

In the following detailed description, specific exemplary embodiments in which the disclosure may be practiced are described in sufficient detail to enable those skilled in the art to practice the invention, and it is to be understood that other embodiments may be utilized and that logical, architectural, programmatic, mechanical, electrical and other changes may be made without departing from the scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiments.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized.

As further described below, implementation of the functional features of the invention is provided within processing devices/structures and involves use of a combination of hardware, firmware, as well as several software-level constructs (e.g., program code). The presented figures illustrate both hardware components and software components within example mobile device architecture having a specific processing unit and functional logic. The illustrative and described embodiments assume that both the components within the architecture as well as the location of specific logic within one or more of the components can be different from that illustrated.

Figure 1:
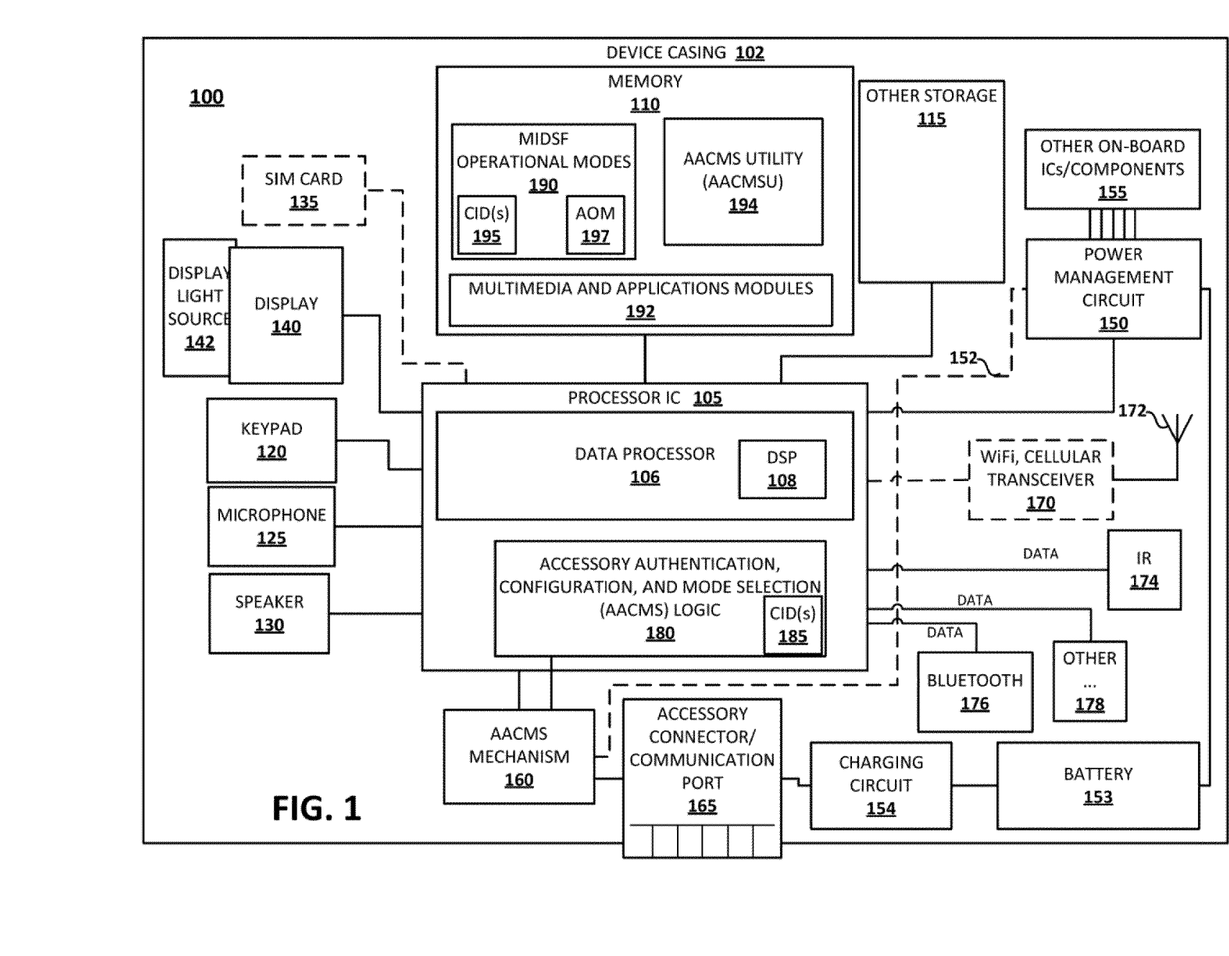
FIG. 1 is a block diagram representation of an example electronic device within which various features of the described embodiments are implemented.

With specific reference now to FIG. 1, provided is a block diagram depicting the component-level architecture of an example electronic device 100, within which functional aspects of the described embodiments can advantageously be implemented. For simplicity in describing the embodiments herein, example electronic device 100 is assumed to be a mobile phone and will hereinafter be interchangeably referred to as mobile phone 100. While the embodiments presented herein are specifically described with reference to an example mobile phone, it is appreciated that the functionality and/or features of the described embodiments are fully applicable to different types of electronic devices that are capable of being electrically and/or communicatively coupled to a cradle or other device accessory via a physical connector, such as an enhanced mini/micro universal serial bus (EMU). Mobile phone 100 comprises a device casing 102 which houses/encases a plurality of functional components of mobile phone 100, including processor integrated circuit (IC) 105, which comprises data processor 106 and integrated digital signal processor 108. Processor IC 105 can be generally and interchangeably referred to as "processor" to represent all of the processing components and functional logic provided on the processor IC 105. Coupled to processor IC 105 are memory 110, other persistent storage 115, and one or more input/output (I/O) components, of which keypad 120, microphone 125, and audio speaker 130 are illustrated. The I/O components coupled to processor IC 105 further comprise display device 140, which has a display light source 142 associated therewith. In one embodiment, display 140 can be a touch screen display, and depending on the level of user interfacing functionality supported by the touch screen display, mobile phone 100 can optionally not be provided a keypad 120.

The various I/O components allow for user interfacing with mobile phone 100. In addition to these above components, mobile phone 100 can also include other components utilized to enable standard voice, data, and/or multimedia communication from/to mobile phone 100. Among these components are wireless transceivers 170, which are connected to antenna 172 to enable communication of radio frequency (RF) and/or wireless signals from and to mobile phone 100. Certain forms of the received RF/wireless signals can be converted into audio, which can be outputted via speaker 130 during a voice communication being facilitated and/or performed via mobile phone 100. Also illustrated as example communication components for communicating data and/or other content to and from mobile phone 100 are infrared (IR) transceiver 174, Bluetooth transceiver 176, and a general other communication module(s) 178, representing other types of transceivers and/or communication portals.

Depending on the type of network for which the mobile phone 100 is designed, mobile phone 100 can comprise a Subscriber Identity Module (SIM) card 135 that stores unique features corresponding to the particular subscriber in possession of the SIM card 135. For example, mobile phone 100 can be a global system for mobile communication (GSM) phone and thus includes SIM card 135, which connects to processor IC 105 via a SIM card adapter/port (not shown). SIM card 135 may be utilized as a storage device for storing data or general content, similar to other storage 115 and/or memory 110.

To enable mobile phone 100 to connect to and interface with one or more accessories, mobile phone 100 comprises accessory connector, which can also be referred to as accessory communication port 165. Accessory communication port 165 is coupled to an accessory authentication, configuration, and mode selection (AACMS) mechanism 160, which can be located on processor IC 105, in one or more embodiments. In an alternate embodiment, AACMS mechanism (160) can be integrated within or be provided by programmable logic on processor IC 105, such as AACMS logic 180. Alternate embodiments can be provided in which the authentication aspects and the mode selection aspects of the disclosure are provided via separate physical and/or logical components, rather than via a single integrated mechanism/logic. For simplicity in describing the invention, these functions are described as being provided via an integrated mechanism/logic. In the presented embodiments, accessory communication port 165 is coupled to the processor 105 and enables connection of the mobile phone 100 to a device interface mechanism of an accessory.

Processor IC 105 and the other components of mobile phone 100 that require electrical power can be coupled to and receive power from power management circuit 150. Power management circuit controls the distribution of electrical power to the various components of mobile phone 100 via a power distribution mechanism on the phone's motherboard (not specifically shown), on which the components are built/embedded. An example power supply bus 152 is provided via the dashed line connecting power management circuit 150 to AACMS mechanism 160. Within the described embodiments, a direct current (DC) is supplied from mobile device 100 to a connected accessory via an ID bus of accessory connector 165, and the voltage level of that direct current can be adjusted by AACMS mechanism 160 or power management circuit 150. Aspects of the disclosure explaining how this functionality is utilized to enable operating mode selection are provided in detail below. Power management circuit 150 couples to a power source, such as a battery 153 and/or a charging circuit 154. Power management circuit 150 also provides electrical power to the various other on-board ICs and/or components, generally represented by block 155.

In one or more embodiments, the adjustment of the voltage level can be triggered by a signal sent from processor IC 105 or from AACMS mechanism 160 or AACMS logic 180. Also, the term "voltage level change" can be interchangeably referred to as a pulse or a voltage pulse, in one or more embodiments. It is appreciated that the term pulse can refer to a detectable temporary change in voltage magnitude lasting over a short period of time. Throughout the description, reference can be made to a pulse and a voltage level change to interchangeably refer to the trigger mechanism that causes the connected accessory to change from one operational mode to a next operational mode.

As illustrated, processor IC 105 can include a programmable microprocessor (of which data processor 106 is provided as an example), as well as a digital signal processor (DSP) 108 that controls the communication and other signal processing functions/operations of mobile phone 100. These functions/operations can include, but are not limited to, data processing and signal processing, respectively. Additionally, the functions/operations of the programmable microprocessor (data processor 106) can include AACMS logic 180, which supports the authentication, configuration, and/or mode selection processes for authenticating and configuring a connected accessory, such as a cradle, and for selecting a particular operational mode for the connected accessory. AACMS logic 180 can comprise a cradle identifier (CID) module 185 that includes a listing of different cradle IDs to enable authentication of only select types of accessories. The authentication, configuration, and mode selection features are described in greater detail below. In one embodiment, AACMS logic 180 comprises programmable code that automatically executes on data processor 106 when connection to the accessory via accessory communication port 165 is detected.

In addition to the above hardware components, several functions of mobile phone 100 and specific features of the invention may be provided as functional code and/or data that is stored within memory 110 and/or other storage 115 and is executed on or utilized by data processor 106. Thus, data processor 106 executes the various functional code/firmware (e.g., AACMS utility (AACMSU) 194) to provide processor-level control for the authentication, configuration, and operational mode selection of an accessory to which mobile phone 100 is physically coupled.

In addition to AACMSU 194, also stored within memory is an operational mode look-up table, mode identifier and supported functionality (MIDSF) table 190, which includes or is associated with a corresponding CID table 195 as well as an accessory operational mode (AOM) table 197. The functionality associated with each of these data structures or tables are described below with reference to FIGS. 7 and 8. Also stored within memory are one or more multimedia and/or applications modules 192, which when executed by processor 106 enables various functional features and generates the user interface mechanisms of mobile phone 100. According to one implementation, AACMSU 194 is executed by processor 106, and AACMSU 194 generates AACMS logic 180, which performs/provides a method comprising: (1) in response to detecting an initial connection of a device universal serial bus (USB) connector of the electronic device to an accessory, instantiating an authentication and configuration protocol on the electronic device to authenticate the accessory; (2) receiving, via signal and communication lines established via connection of pins of the device USB connector to the USB connector of the accessory, one or more types of information during authentication of the accessory, which one or more types of information identifies to the electronic device one or more alternate operational modes of the accessory corresponding to one or more functional features of the accessory; (3) in response to successful authentication of the accessory, configuring an accessory usage setting of the electronic device to correspond to the accessory being in a first operational mode. The method further provides, (4) in response to a request to change an operational mode of the accessory to a second operational mode among the one or more alternate operational modes: (a) generating one of a pulse and a voltage level change on a first signal line of the pins of the device's USB connector to communicate to the accessory that a change in a present operational mode of the accessory is being initiated; and (b) modifying the accessory usage setting of the electronic device, relative to functional operation of the accessory when the accessory is in the second operational mode, to enable the electronic device to utilize one or more functional features associated with the second operational mode of the accessory.

These method functions represent a subset of the functional processes of the described embodiments, which processes are expanded upon below and illustrated in part by the flow chart of FIG. 9, as well as the other figures. In one alternate embodiment, the functions are performed in part by the AACMS mechanism 160 and specifically internal logic that (a) initiates the authentication and configuration processes responsive to detection of an electrical coupling of the accessory communication port 165 with a device interface mechanism of the connected cradle, and (b) performs the mode selection processes described herein.

As generally described herein, the configuration and mode selection processes are performed on a connected accessory, such as a cradle. A general representation of an accessory to which the disclosure can apply comprises: a universal serial bus (USB) connector; and an integrated circuit (IC) electrically coupled to the USB connector and which comprises authentication information of the accessory and one or more types of information that identifies to a connected electronic device one or more alternate operational modes of the accessory corresponding to one or more functional features of the accessory. The accessory further comprises logic associated with the IC that responsive to detection of a connection by the electronic device via the USB connector, transmits to the electronic device, via one or more signal and communication lines established over a USB connection, one or more types of information required to perform authentication and configuration of the accessory, including the one or more types of information that identifies the one or more alternate operational modes supported by the accessory. The USB connection can comprise pins of a USB connector of the electronic device connected with pins of the USB connector of the accessory. The accessory also comprises operational mode switching (OMS) logic that, in response to detecting a pulse or voltage level change on an identifier (ID) line of the USB connector from the connected electronic device, following receipt of information on the signal and communication lines identifying a next alternate operational mode from a current operational mode in which the accessory is operating, changes the operational mode of the accessory to the next alternate operational mode and activates features of the accessory associated with the next alternate operational mode.

Further, in one embodiment, the OMS logic: detects a current unavailability of one or more features that are supposed to be available in a current operational mode of the accessory; and in response to the detecting, generates and transmits an accessory generated pulse or a change in voltage level on the ID line to signal to the electronic device that a negative change has occurred in the features that are currently available on the accessory.

Figure 2:
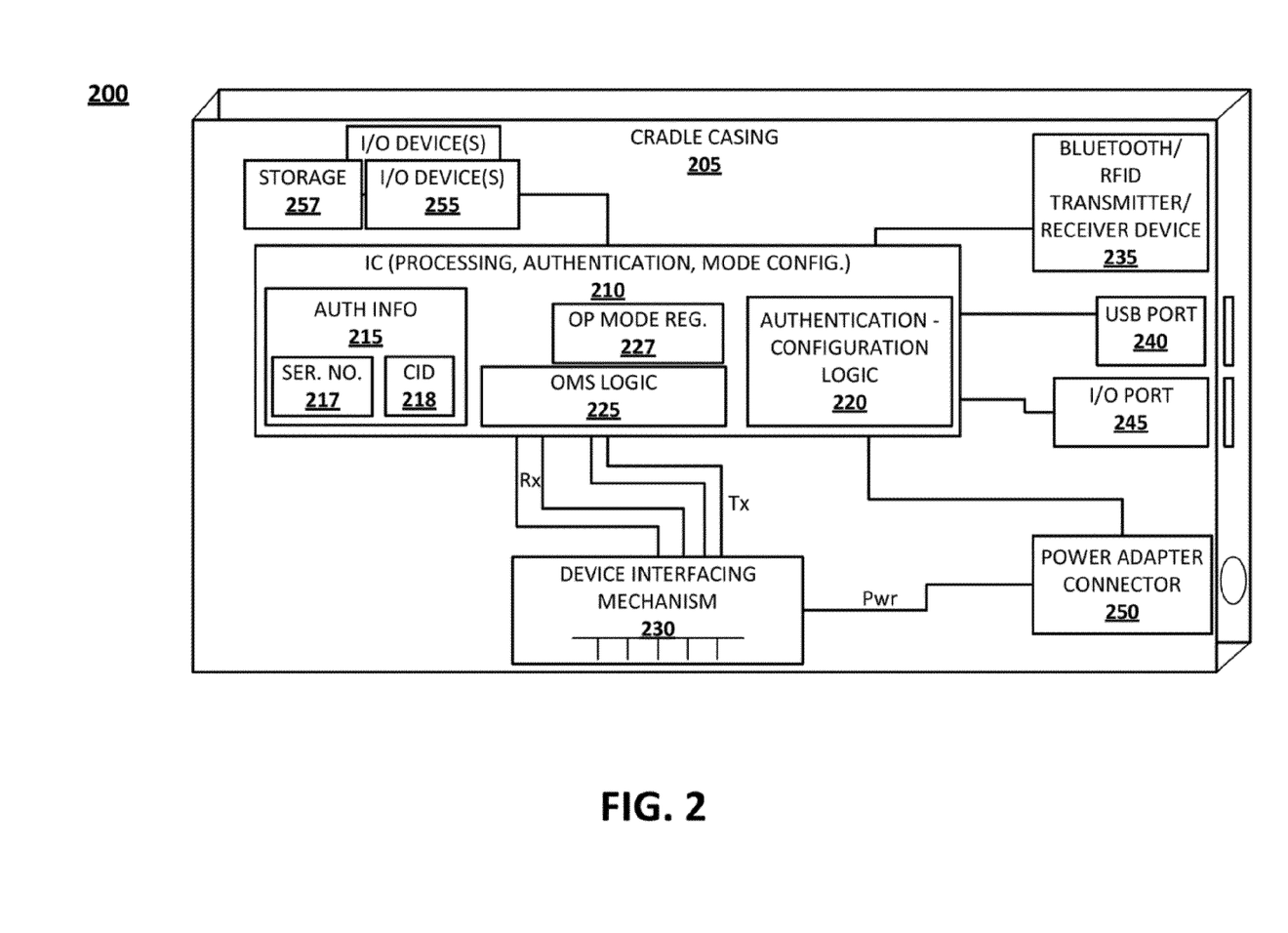
FIG. 2 is a block diagram representation of an example cradle having integrated circuitry and logic modules that enable the cradle to selectively operate in a plurality of different operating modes, according to one embodiment.

Referring now to FIG. 2, there is illustrated a block diagram representation of an example cradle 200, which is designed and manufactured as an accessory to example mobile phone 100. The cradle 200 is generally configured for receiving an electronic device, particularly a mobile phone, such as mobile phone 100. The cradle 200 comprises an external cradle casing 205, with a device interfacing mechanism 230 provided at a surface of the casing 205. It is to be understood that, in one or more implementations, the device interfacing mechanism 230 can be configured on the cradle such that the interfacing components can extend or not extend from a surface of the casing 205. Cradle casing 205 has specific dimension and shape to enable the mobile phone 100 to be docked on and/or inserted into the cradle 200 and to electrically and communicatively connect with device interfacing mechanism 230. In one alternate embodiment, the connection between mobile device 100 and cradle 200 is via a USB bus connector (not shown), having USB connectors on both ends. Cradle 200 comprises integrated circuit (IC) 210 disposed within the cradle casing 205 and electrically and communicatively coupled to the device interfacing mechanism 230. IC 210 comprises authentication information 215 of the cradle 200, such as, but not limited to serial number 217 and unique cradle identifier (ID) 218.

Also provided within IC 210 is operational modes register 227, which comprises a current setting of the operational mode of the cradle 200. In one embodiment, the operational modes register 227 is set to the value most recently provided by the connected electronic device once a pulse or voltage level change is received on the ID line of the USB connection. In addition to the register, IC 210 also comprises operational mode selection (OMS) logic 225, which sets the cradle to one of a plurality of possible operational modes. In one embodiment, following or during authentication of the cradle 200, OMS logic 225 transmits to the connected device data identifying the N distinct operational modes that the cradle can be utilized in, where N is an integer variable. The N distinct operational modes comprise a default mode. In one embodiment, the cradle is initially set to the default operational mode following or during the authentication and/or configuration process. It is also appreciated that in one alternate embodiment, the operational modes supported by a particular cradle can be determined from the CID 218 of the cradle, which CID 218 is transmitted to the connected device and matched to (or compared against) the CID list (or table) 195 maintained within memory 110 of the connected device (i.e., mobile device 100). This CID list 195 is further associated with the MIDSF table 190 (FIG. 1) and utilized to perform several of the functional aspects of the described embodiments. As shown, IC 210 further comprises, or has associated therewith, authentication and configuration (AC) logic 220. Responsive to detection of an electrical coupling of a communication port (165) of an electronic device (e.g., mobile phone 100) to device interfacing mechanism 230 of the cradle 200, the cradle 200 automatically transmits the identifying data for each of the N operational modes to the connected electronic device. In one embodiment, and as described in detail below, transmission of the N operational modes, including the default mode, causes the electronic device connected to the cradle 200 to activate specific operating functions based on receipt and identification of the current operational modes and the next and/or other available operational modes.

Cradle 200 can also comprise one or more I/O devices 255, including storage 257, and one or more ports for coupling or wirelessly connecting the cradle to secondary devices. Of these possible other components, cradle 200 is illustrated having Bluetooth and/or RFID transceiver 235, one or more universal serial bus (USB) ports 240, and one or more I/O ports 245. As further illustrated, device interfacing mechanism 230 is coupled via a power (Pwr) bus to a power adapter connector 250 at which electrical power can be supplied to the cradle 100 from an external power source.

In one embodiment, device interfacing mechanism 230 can be a mini/micro USB receptor configured according to established mini/micro USB protocols. The mini/micro USB can also be a secure enhanced mini/micro USB (or SEMU). Device interfacing mechanism 230 is coupled via a plurality of receiving (Rx) buses and a plurality of transmission (Tx) buses to IC 210.

Figure 3:
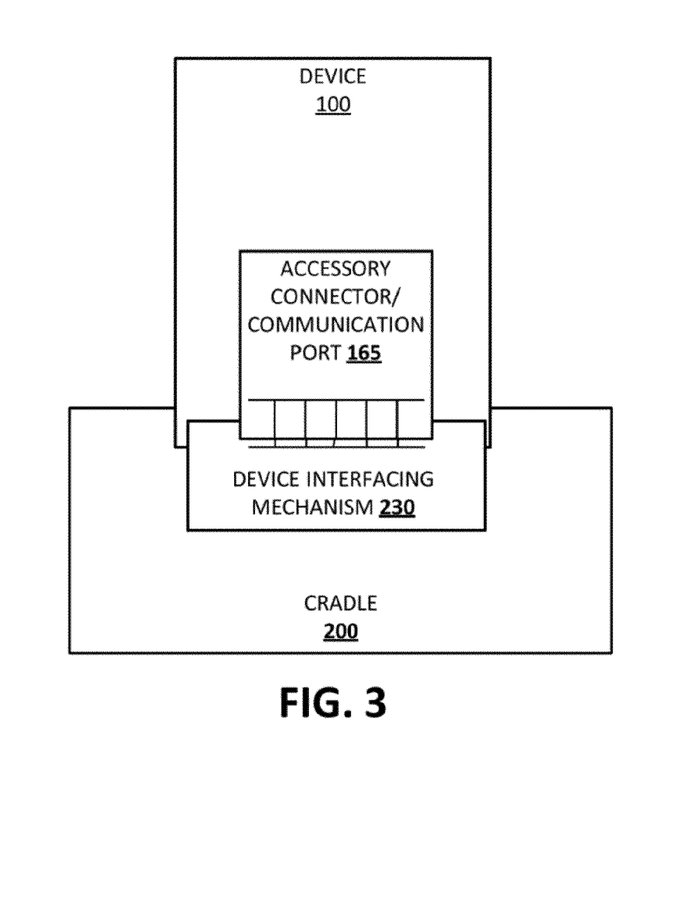
FIG. 3 illustrates connection of an example electronic device to an example cradle via respective device interfacing mechanisms and/or ports, according to one embodiment.
Figure 4:
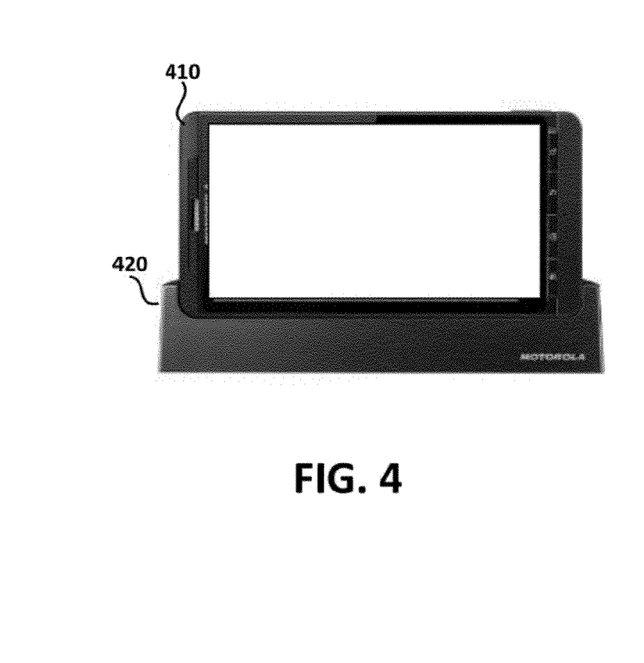
FIG. 4 illustrates an example desktop cradle with attached electronic device, according to one embodiment.

FIG. 3 illustrates the physical coupling and/or connection of the device interface mechanism 230 of cradle 200 (FIG. 2) with accessory communication port 165 of mobile phone 100 (FIG. 1). FIG. 4 illustrates an actual representation of a mobile phone 410, such as a Motorola smart phone (of Motorola Mobility Inc.) docked within an example Motorola desktop cradle 420. Other types of similar cradles can be presented as the accessory, such as, for example an in-vehicle/car cradle. Also, there are different types of cradles available, and each different cradle type can provide a unique set of interchangeable operational modes, when designed with the functional aspects of the present disclosure taken into consideration. The embodiments described herein assume that the desktop cradle 420 is of a particular first type of cradle, having a CID that is different from a second, different type of cradle with a second CID, and that each type/class of cradle has specific operational capabilities and/or modes that are supported by that class (type) of cradle.

Those of ordinary skill in the art will appreciate that the hardware depicted in FIGS. 1 and 2 and the inter-device connectivity provided by FIGS. 3 and 4 may vary depending on implementation. For example, other internal hardware or peripheral devices may be used in addition to or in place of the hardware depicted in FIGS. 1 and 2. Also, the processes of the present invention may be applied to any portable/handheld electronic device or data processing system or similar device with a connecting port for connecting the device to an accessory that is one of many different types (or classes) of accessories, with specific capabilities that can be supported by the device. Thus, the depicted examples are not meant to imply architectural limitations with respect to the presented embodiments.

According to the EMU protocol, the micro/mini USB comprises a series of five (5) pins, which are generally provides as voltage pin, ground pin, ID pin, and two data transfer/communication pins, D+ and D−. The conventional functionality associated with the various pins is know in the art and are not presented in detail herein. However, aspects of the described embodiments involve the enhanced usage of several of these pins to provide additional functionality with the USB connections in order to support accessories that have multiple different modes of operation (or operational modes).

Figure 5:
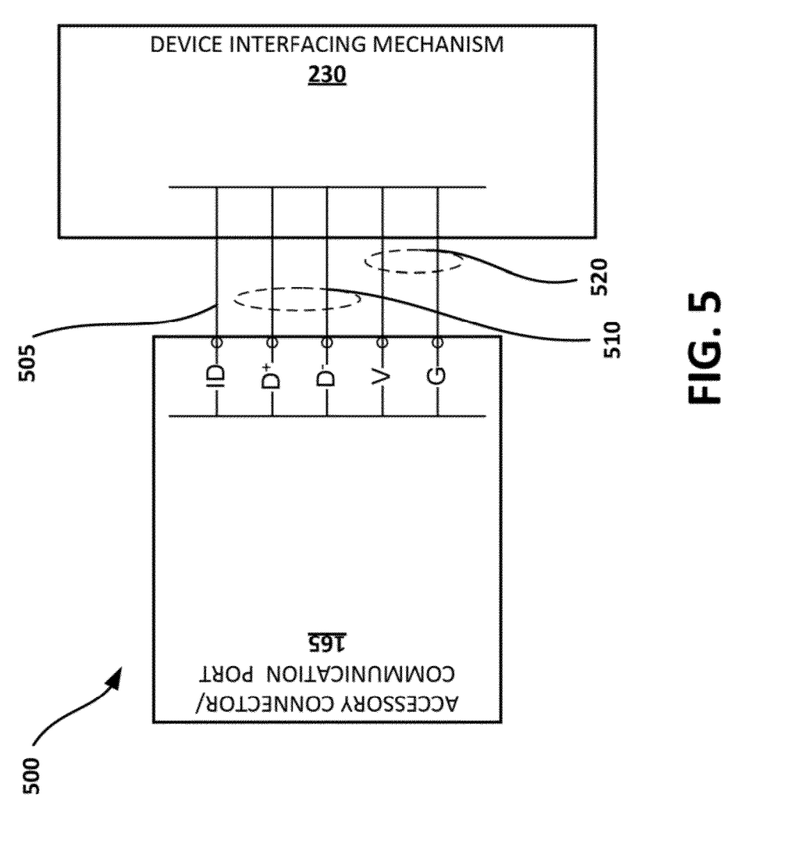
FIG. 5 is an expanded view of the signal wires connecting the device interface mechanism to the connecting ports of the example cradle, according to one embodiment.

Referring now to FIG. 5, there is illustrated an expanded view of the connection of the USB pins from respective USB connectors of device interface mechanism 230 of cradle 200 with accessory communication port 165 of mobile phone 100. The coupling of the USB pins further illustrate example USB buses or signal lines connecting the two components. A first bus or line 505 of the USB busses represents the USB ID line and is therefore interchangeably referred to as the ID line or ID bus. The remaining buses or lines allow for the communication of signals and data between the two components (and associated devices) and also for the powering of the accessory. The specific buses that provide signal communication between the devices are interchangeably referred to as signal and communication buses (or lines) 510. In at least one embodiment, the signal and communication buses 510 comprise USB D+ and D− lines. The power and ground buses 520, labeled V and G, are the voltage and ground buses that provide power to the accessory.

According to one or more described embodiments, the USB D+/D− pins are utilized to also mux on universal asynchronous receiver/transmitter (UART) transmit datapath or receive datapath (TxD/RxD). According to the described embodiments, a standard mode provides UART on USB pins. However, other embodiments provide alternate modes, which can vary from accessory to accessory. Certain accessories can have multiple alternate modes. When an event happens on the accessory, the host is notified by an accessory generated pulse on the ID line. In the described embodiments, a voltage level provided on the identifier (ID) line in the host electronic device is utilized to signal the accessory of a change to one of a standard, default mode or an alternate operating mode. The accessory can also identify at least two different operating modes via a voltage level change on the ID line, in one embodiment, i.e. whether or not a cable is plugged into the accessory.

Figure 6:
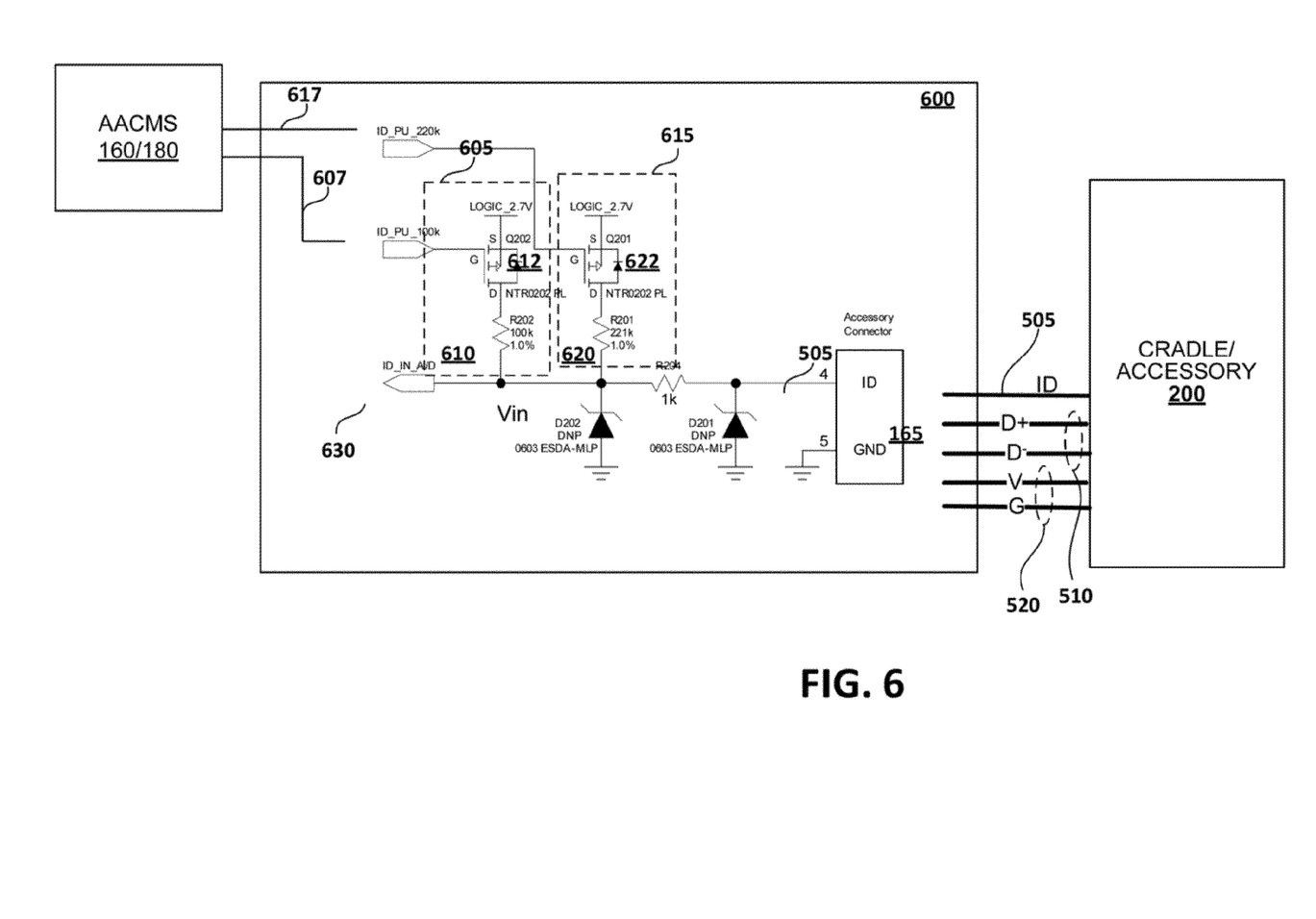
FIG. 6 illustrates an example pull up circuit that is utilized to provide one of a high voltage level or a low voltage level on the first identifier (ID) signal line of the cradle's universal serial bus (USB) interface, according to one embodiment.

FIG. 6 illustrates a circuit schematic by which the voltage level change and/or the pulse can be provided on the ID line 505 of the USB connector. It is appreciated that the term voltage level change in this context refers to an increase in the magnitude of the voltage level on the ID line. Circuit 600 comprises ID line 505 to which is connected two different pull up sub circuits, first pull-up sub circuit 605 and second pull-up sub-circuit 615. ID line 505 terminates at accessory connector 630, to which cradle 200 connects. The connection to accessory connector is completed via an extension of ID line 505, USB signal lines 510, and power and ground lines 520 (see FIG. 5). ID line 505 includes a resistor, ID line resistor 8204, which in the illustrative embodiment has a low resistance value of 1k. Each of the pull-up sub circuits 605, 610 have a respective pull-up resistor 610, 620, which connects at one end to ID line 505 in the configuration shown. As provided, the pull-up resistors 610 and 620 have a different impedance value, which allows for two different levels of voltage to be provided across the resistor (R204) of ID line 505 depending on which pull-up sub circuit is currently on. Pull-up sub circuits 605, 615 can also have other circuitry and/or circuit components, shown connected to the other end of the pull-up resistor 610, 620. In the illustrative embodiment, these circuit components comprise a switch mechanism that can be utilized to turn the pull-up sub circuit on or off based on a received control input. A logic high voltage is applied to the power terminals of each pull-up sub circuit 605, 615. In the presented embodiment, that logic high voltage is 2.7V, although the actual magnitude of the voltage applied can vary depending on implementation. Accordingly, each pull-up sub circuit 605, 615 is capable of generating a voltage level increase or pulse on ID line 505 when that sub circuit is turned on via its switching mechanism. The level of voltage increase can be dependent on the resistive values of the pull-up resistors 610, 620 relative to the ID line resistor (R204).

Each pull up sub-circuit 605 and 615 is coupled to a controller, such as AACMS mechanism 160 (FIG. 1) of mobile device 100. Control of the switching mechanism can be performed by AACMS mechanism 160 and/or AACMS logic 180, depending on the particular implementation. The controller selectively provides a signal to one of inputs 607 and 617 to turn the particular pull-up circuit on. When the first pull-up sub circuit 605 is to be turned on, the controller (160/180) transmits a control signal via first pull-up control input 607 to the switching mechanism 612. Likewise, when the second pull-up sub circuit 615 is to be turned on, the controller (160/180) transmits a control signal via second pull-up control input 617 to switching mechanism 622.

In the illustrative embodiment, PMC 150 can selectively apply power to ID line segment 605 via one of first pull-up sub-circuit and the second pull-up sub-circuit to cause a different voltage level to be experienced on ID line segment 605 and ultimately ID line 505. When a first pull-up sub circuit 605 generates a high voltage on ID line 505, the voltage level increase is detected by the connected accessory, cradle 200. To generate a pulse versus a voltage increase, the particular pull-up sub circuit is turned on for a small period of time. In one embodiment, the voltage increase is provided by the second pull-up sub circuit, while a pulse is provided by the first pull-up sub circuit. Based on the relative values of the pull-up resistors, the pulse would provide a voltage magnitude that is higher than the sustained voltage level increase, but the voltage magnitude would be for a relatively short period of time.

According to one embodiment, the ID line 505 of the USB maintains a standard or default DC voltage level of a given magnitude M. The electronic device can then select between one of the two pull-up sub circuits 605, 615 to change the DC voltage on the ID line 505 to a value of M+N, where N is a positive value, by applying power to the particular pull-up resistor 610, 620. A first DC voltage level of M on the ID line then signals the device's operation in the standard and/or default mode, while a second DC voltage level of M+N signals the device's switching to and/or operating in an alternate operating mode. In one embodiment, when the accessory is in the standard operational mode, i.e., STD mode, the accessory is always providing UART communication over the USB D+/D− lines 510. It is appreciated that alternative methods for configuring the circuitry of the ID line and/or the USB connector can be implemented to effect the voltage level change on the ID line, and the presented circuit configuration of FIG. 6 is simply one embodiment of the family of possible circuit configurations.

Prior to allowing the features described herein, AACSM logic of the device performs an authentication procedure to uniquely authenticate the accessory. The AACSM logic identifies the serial number and other features of the accessory. The accessory and host device perform this authentication function to confirm that the accessory is an approved accessory for connecting to the device. For example, only certain proprietary accessories may be approved to connect to a manufacturer's device, and only the approved accessories can then be functionally associated with the device.

In one embodiment, as a part of authentication, the bit stream transferred to the device from the accessory during initial activation of the connection includes some features of the alternate operational mode of the accessory. If the accessory has a single alternate operational mode, the alternate operational mode is static and is identified in the bit stream generated by and/or received from the accessory. In this case of a singular alternate operational mode, the generation of a pulse or change in voltage level (to change the accessory to operate in an alternate mode) will always change from the default, normal mode to the single alternate mode, and vice versa. However, in an alternate embodiment, where the accessory supports multiple alternate modes, the accessory and host device communicate over UART to signal which one of the multiple alternate modes will be selected when the host device signals the alternate mode by pulling up the specific alternate operational mode identified by pre-transmitted mode identifying data.

Figure 7:
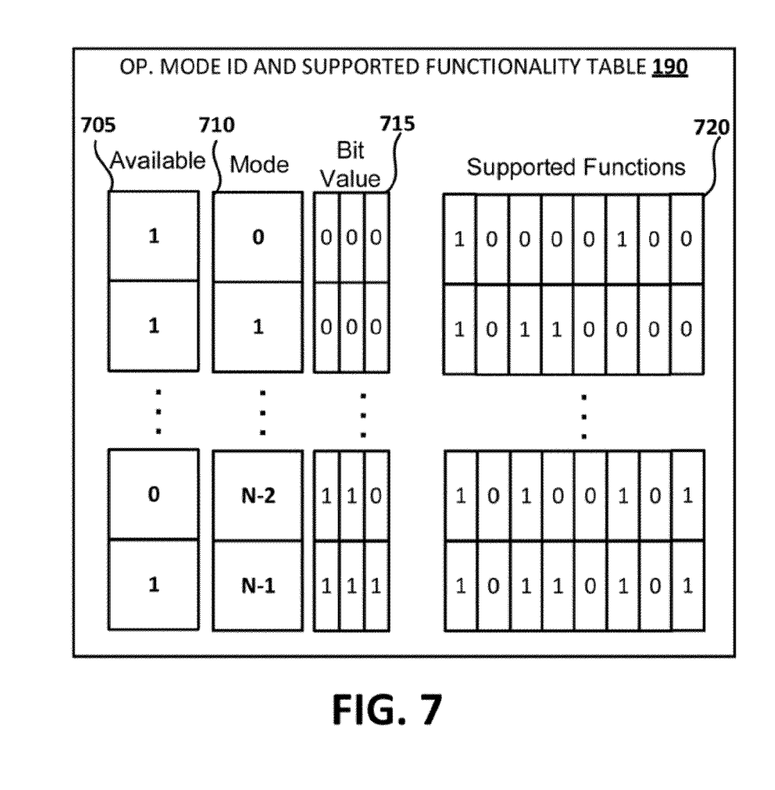
FIG. 7 illustrates an example table of types of functions supported by the different accessory operating modes available for use by an electronic device, according to one embodiment.
Figure 8:
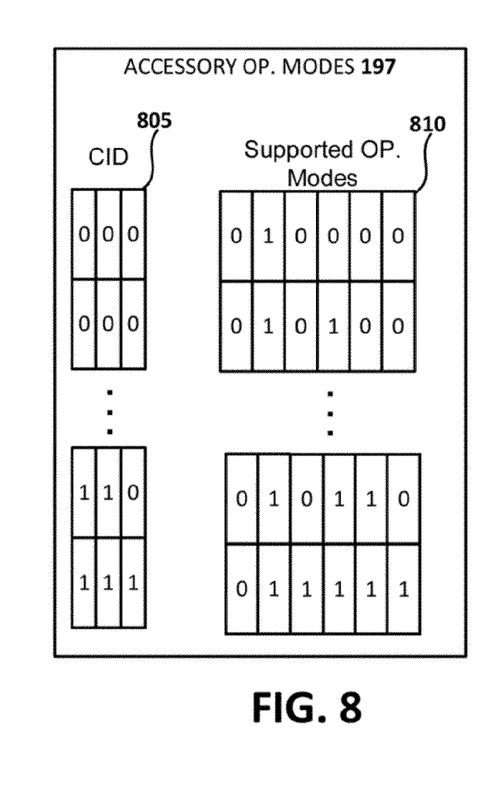
FIG. 8 illustrates an example accessory operating mode table showing the different operating mode per different type of cradles, utilizing the cradle identifiers (CID), according to one embodiment.

FIGS. 7 and 8 illustrate two example data structures that can be utilized to support the operating mode setting features of the described embodiments. Specifically, FIG. 7 provides an expanded view of a mode identifier and supported functionality (MIDSF) table 190. Within MIDSF table 700 are several entries of data related to N different operating modes that may be supported by a connected accessory, where N is an integer greater than one. These different modes are provided within mode column 710 and include standard, default mode 0 and N−1 alternate modes, numbered as mode 1 through mode N−1. Each mode has a corresponding unique bit value, indicated within bit value column 715, to uniquely identify the different modes when the modes are being selected by the electronic device and requested at the accessory. The specific functions associated with a particular operational mode can be identified via supported functions column 720, which in one implementation is a function chart that maps to a series of pre-identified operating functions. Example functions can be speakerphone, stereo audio, backlight display, time clock display, and others. Also provided within MIDSF table 700 is availability column 705, which is a device settable column that indicates which operational modes are actually supported by the connected accessory. In one embodiment, during the authentication and configuration processes that follow initial connection of the accessory to the electronic device, the device determines which specific operational modes are supported by the accessory to which the device is establishing a connection. The electronic device can perform that determination based on one or more of the accessory's CID and/or serial number and/or other signals transmitted from the accessory that can indicate available features of the accessory.

FIG. 8 then provides an example accessory operating mode (AOM) table 197 depicting the association of specific accessory CIDs 805 to supported operating modes 810. Thus, for example an accessory with CID of 000, which can be a legacy accessory, only provides a single operating mode, the default mode, while a newer accessory with CID of 111 can support five or more different operating modes, including the standard or default mode and four (4) alternate operating modes. Of course, the number of operating modes supported by the particular accessory can be un-correlated to whether the accessory is a newer designed accessory versus an older legacy design, and the embodiments do not presume that the operating modes supported are in any way associated with the specific type and/or class of a particular accessory, although some correlation may exist, in some embodiments. With these example data structures stored within memory of electronic device 100 (FIG. 1), once the CID of the accessory is received by the electronic device, the electronic device is able to immediately identify which operating modes are supported by that particular accessory.

Aspects of the embodiments provide a method for multiplexing communications on USB lines of a USB connector connecting an accessory to an electronic device, while the accessory is not capable of communicating in USB mode. During the authentication process to validate the accessory, the electronic device determines that the accessory has special operating modes in addition to the standard, default mode for that accessory (i.e., each accessory can have a different standard, default operating mode). The ID line of a USB connector is biased between two states by the electronic device to put the accessory in a standard or alternate operating mode. In the alternate operating mode, universal asynchronous receiver/transmitter (UART) communications is exchanged between the device and the accessory on the USB data lines. Additional aspects of the embodiments provide a method for an accessory to signal a state change via the USB ID line to a connected electronic device. The accessory provides a pulse on the ID line, which signals a change of state to the connected electronic device. The accessory also provides a DC level signal that indicates what the actual state change on the accessory is.

Figure 9:
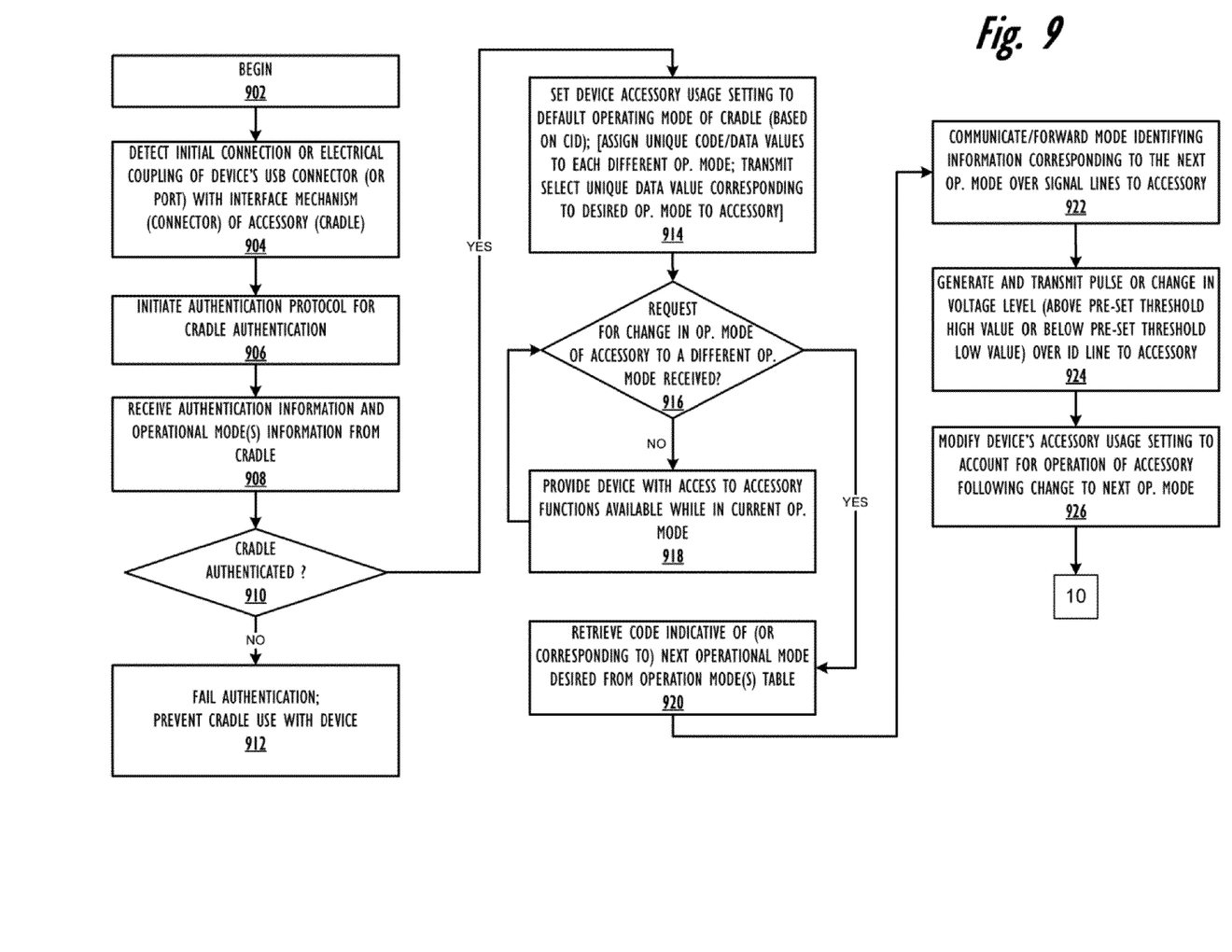
FIG. 9 is a high level logical flowchart of an exemplary method by which accessory authentication and configuration and operational mode selection (COMS) logic configures the electronic device and the cradles via the signal lines, according to one embodiment.

The flow chart of FIG. 9 illustrates a method by which certain aspects of the above described illustrative embodiments can be implemented. More specifically, FIG. 9 illustrates a method by which the AACMS logic 180, or ACMS utility 194 executing on processor 106, of mobile device 100 authenticates and configures a connected accessory and enables the mobile device 100 to trigger a plurality of different operational modes of the accessory by multiplexing signals over the USB data lines connecting the mobile phone to the accessory. Although the method illustrated in FIG. 9 may be described with reference to components and functionality illustrated by and described in reference to FIGS. 1-8, it should be understood that this is merely for convenience and alternative components and/or configurations thereof can be employed when implementing the method. Certain portions of the method can be implemented by ACMS utility 194 executing on processor 106 within mobile phone 100 (FIG. 1)

or alternatively by AACMS logic 180 in conjunction with AACMS mechanism 160. The executed processes then control specific operations of or on mobile phone 100 and/or cradle 200. For simplicity in describing the methods, all method processes are described from the perspective of AACMS logic 180 and/or AACMS mechanism 160 within mobile phone 100.

The method begins at initiator block 902 and proceeds to block 904 at which AACMS logic 180 detects electrical coupling of accessory communication port 165 of mobile phone 100 with device interface mechanism 230 of cradle 200. AACMS logic 180 initiates a cradle authentication protocol (block 906), and receives authentication information along with information about operational mode(s) supported by cradle 200 (block 908). AACMS logic 180 performs the pre-programmed authentication steps and determines at block 910 whether the cradle was successfully authenticated. In one or more embodiments, the authentication of the accessory (e.g., cradle 200) with the connected electronic device (mobile phone 100) is performed via a device communication and authentication protocol, such as the whisper protocol, among others. The whisper protocol ensures that the cradle 200 is capable of being utilized with the electronic device (100) prior to configuring the cradle and the device to communicate with each other during device operation. The method for performing authentication, and particularly for performing secure authentication, of a cradle (or other accessory) that is coupled to the electronic device and for communicating with mobile phone is beyond the scope of this disclosure. Thus, no specific detail of that process is presented herein. Returning to decision block 910, in response to the cradle failing to authenticate, the AACMS logic 180 fails the authentication process and prevents further communication from and/or use of the cradle with the mobile phone (block 912).

In response to successful authentication of the accessory, the AACMS logic 180 configures an accessory usage setting of the electronic device to correspond to the accessory being in a first operational mode, which in one embodiment, is a standard or default operating mode (block 914). Additionally, the AACMS logic 180 can assign unique data values to identify each operating mode that is supported by the accessory. In one embodiment, the AACMS logic determines from the received one or more types of information identifying one or more alternate operational modes of the accessory that the accessory supports a plurality of different alternate modes of operation, and the AACMS logic assigns a specific, unique data value to each different alternate operating mode to enable each alternate operating mode to be uniquely identifiable. The AACMS logic transmits to the accessory, via the signal and communication lines, a specific unique data value corresponding to a specific operational mode desired to be activated at the accessory, wherein the specific unique data value is transmitted before generating a pulse or voltage level change to communicate to the accessory that a change in a present operating mode is being triggered.

Returning to the flow chart, the AACMS logic 180 monitors for receipt of a request to change the operational mode of the accessory and determines at block 916 whether such a request is received. Assuming no such request is received, at block 918, the AACMS logic 180 provides the mobile device 100 with access to the accessory functions that are available while in the current operational mode. In response to receiving a request to change an operational mode of the accessory to a second operational mode among the one or more alternate operational modes, the AACMS logic 180 retreives, from the operational mode table, the code indicating the next operation mode that is desired (block 920). AACMS logic 180 communicates, to the accessory, mode identifying information corresponding to the second operational mode to trigger the accessory to change to the second operational mode when a subsequent pulse or voltage level change is detected by the accessory (block 922). The accessory is designed to automatically change from the present operational mode to the second operational mode indicated by the received mode identifying information.

The AACMS logic 180 generates a pulse and/or a voltage level change on a first signal line of the USB pins of the device's USB connector to communicate to the accessory that a change in a present operational mode of the accessory is being initiated (block 924). The AACMS logic 180 modifies the accessory usage setting of the electronic device, relative to functional operation of the accessory when the accessory is in the second operational mode, to enable the electronic device to utilize one or more functional features associated with the second operational mode of the accessory (block 926).

Thus, the method activates switching between the first operational mode and each of the plurality of alternate operational modes and switching between each of the plurality of alternate operational modes by first transmitting to the accessory unique data identifying a desired next operational mode from among the first operational mode and the plurality of alternate operational modes and then generating a pulse or voltage level change on the first signal line.

In one embodiment, a first operational mode is a standard, default mode providing universal asynchronous receiver/transmitter (UART) on USB communication pins of the USB receiving connector. Instantiating the authentication protocol and setting the accessory to the first operational mode comprises: the AACMS logic receiving authentication information from the accessory and authenticating the accessory as a valid device for connecting to the electronic device and comparing the authentication information with pre-established authentication parameters of valid devices; and enabling the accessory to be utilized with the electronic device only following successful authentication of the accessory.

In one aspect, the USB receiving connector comprises (1) a first pin that is configured as an identifier (ID) line when coupled to a corresponding pin of a USB connector of a connected second device and (2) a plurality of second pins configured as transmit and receive signal lines for data communication/exchange with the connected second device. Also, generating a pulse or voltage level change on a first signal line comprises changing a voltage magnitude of a voltage provided on the ID line relative to a first threshold voltage, wherein the change in voltage magnitude indicates to the accessory that a change in operational mode is desired.

According to one embodiment, the voltage is a direct current (DC) voltage and the method comprises: if the first threshold voltage is a high threshold voltage, the AACMS logic changing a voltage magnitude on the ID line comprises changing the voltage magnitude to a value above the high threshold voltage to signal the change in operational mode to the accessory. However, if the first threshold voltage is a low threshold voltage, the AACMS logic changing a voltage magnitude on the ID line comprises changing the voltage magnitude to a value below the low threshold voltage to signal the change in operational mode to the accessory. According to one embodiment, the electronic device comprises a first pull-up resistor and a second pull-up resistor both coupled to the ID line, and changing the voltage magnitude of the voltage provided on the ID line comprises the AACMS logic selecting from among the first pull-up resistor and the second pull-up resistor to effect a change in the voltage magnitude on the ID line from a first voltage value to a second voltage value at which the pulse or voltage level change is generated on the ID line.

According to one embodiment, the method further comprises the AACMS logic detecting a return pulse on the first signal line from the accessory; and in response to detecting the return pulse, automatically polling the accessory for information that indicates what change has occurred in available functional features of the accessory in a present operational mode of the accessory; and modifying an operational mode of one or more of the electronic device and the accessory based on the change identified during said polling with the available functional features of the accessory.

Figure 10:
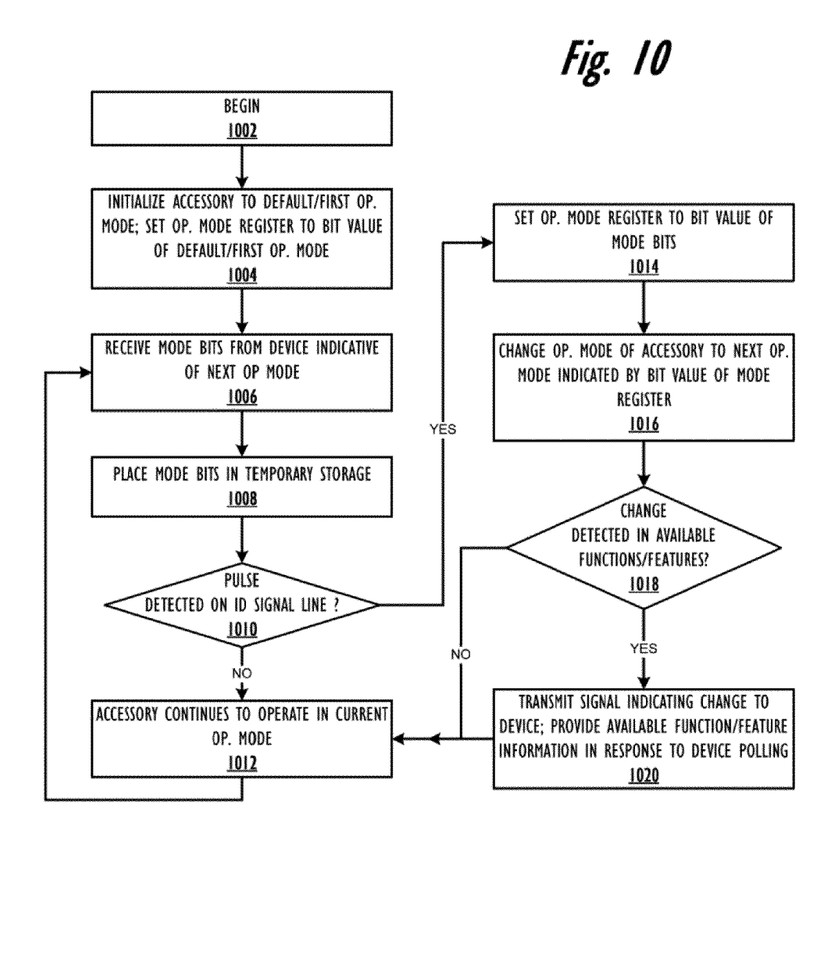
FIG. 10 is a high level logical flowchart of an exemplary method by which the accessory configures itself and/or is configured to a particular operational mode based on receipt of a voltage level change, according to one embodiment.

Referring now to FIG. 10, there is provided a flow chart illustrating a method by which the accessory informs the connected electronic device of a change in the available operating functions of the accessory via the signal lines of the USB connector. Throughout the description of the method, reference is made to the components of FIG. 2, with the method processes being performed primarily by OMS logic 225. The process begins at block 1002 and proceeds to block 1004 at which the OMS logic 225 initializes the accessory to a default, first operating mode. Concurrently, the OMS logic 225 sets the operating mode register to a default value that represents a default operating mode of the accessory. For example, with reference to FIG. 7, the register can be set to 000 to represent the default operating mode, where each operating mode has a different value associated therewith. The OMS logic then receives from the connected device, via the signal and communication lines, operating mode bits that are indicative and/or representative of a next operating mode, which may be a first alternate operating mode (block 1006). The OMS logic places the received mode bits in storage 257 for later access (block 1008). The OMS logic waits for a pulse and/or a voltage level change on the ID line at decision block 1010. If no pulse or voltage level change is detected on the ID line, the accessory continues to operate in the current operating mode (block 1012). In response to detecting a pulse or a voltage level change on the ID line, the OMS logic 225 sets the operating mode register 227 to the previously stored bit value (block 1014), which is retrieved from storage 257. In an alternate embodiment, the received next set of mode bits are automatically placed within the register 227, over-writing the previous mode bits in the register 227. Then, in response to detecting a pulse or a voltage level change, the accessory simply defaults to the operating mode identified by the bit values currently within the register 227. In both alternate embodiments, the register 227 can be simply a pre-set location in the storage 257, rather than a separate structure within the accessory.

The OMS logic 225 changes the operating mode of the accessory to the next operating mode that is indicated by the received value within the operating mode register 227 (block 1016). At decision block 1018, the OMS logic 225 determines whether a change has been detected in the available operating functions and/or features provided by the accessory. If no change is detected, the accessory simply continues to operate in the current operating mode (block 1012). However, if a change is detected in the available functions and/or features, OMS logic causes the accessory to transmit a pulse on the ID line to signal the change to the connected electronic device (block 1020). In one embodiment, the OMS logic 225 can also provide information about the change and/or information indicating which operating functions and/or features are available. The OMS logic 225 can provide this information independently, following the detected change, or in response to polling by the connected device.

The following description presents an example of an accessory that can operate in one of a standard operational mode and at least two alternate operational modes. In this example, a mobile phone dock/cradle has two alternate modes, stereo player mode and/or speaker phone mode. When the mobile phone is placed in the dock (i.e., the USB connectors are inter-coupled), the mobile phone authenticates the cradle and places the cradle into the standard or default STD mode. The mobile phone authenticates the cradle and reads the features supported by the cradle. When the mobile phone user later decides to put the cradle into stereo operating mode (i.e., a first alternate operational mode), the mobile device first communicates to the accessory a signal over the communication and signal lines that indicates "set stereo mode" as the operational mode. The mobile device then changes the voltage level on the ID line to trigger the reset of the accessory to the alternate mode. The accessory receives the voltage level change (e.g., a pull-up of the voltage to above a threshold normal voltage), and the accessory activates (or transitions to) the pre-selected stereo operating mode.

Subsequently (while in stereo mode), in response to the accessory detecting that a stereo cable becomes unplugged, the accessory generates a pulse on the ID line and then changes the voltage level on the ID line. The connected mobile device detects the pulse and monitors the ID line for a signal indicating what has happened at the accessory. The mobile device detects the changed voltage and polls the accessory to find out that the stereo cable is unplugged. In response to detecting that the stereo cable is unplugged, the mobile device routes the audio back to the speakers of the mobile device. Assuming the mobile device user then decides to switch to speakerphone mode, the mobile device transmits a next signal over the communication and signal lines that indicates "set standard operating mode" to the accessory. Then the mobile device pulls up the ID line to trigger the accessory to transition back to standard operating mode. The accessory sees the change in voltage level on the ID line and transitions to standard mode, based on the previously received signal over the communication lines. The mobile device then transmits a third signal to the accessory, while the accessory is in the standard operating mode, indicating a "set to speakerphone operating mode" as the alternate mode. The mobile device then pulls up the ID line to the higher voltage level. The accessory detects the change to the voltage level on the ID line and transitions into the preselected alternate operating mode of speakerphone.

It is important to note that while the present disclosure extends the complexity and layers of multiplexing additional operating features, in addition to audio and accessory ID, which are multiplexed on the EMU bus over the USB D+, D−, and ID lines, aspects of the present embodiments also enable backwards compatibility of the connector for both standard USB and proprietary enhanced USB modes.

The flowchart and block diagrams in the various figures presented and described herein illustrate the architecture, functionality, and operation of possible implementations of systems, devices, and methods according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In some implementations, certain processes of the methods are combined, performed simultaneously or in a different order, or perhaps omitted, without deviating from the scope of the invention. Thus, while the method processes are described and illustrated in a particular sequence, use of a specific sequence of processes is not meant to imply any limitations on the invention. Changes may be made with regards to the sequence of processes without departing from the scope of the present invention. Use of a particular sequence is therefore, not to be taken in a limiting sense, and the scope of the present invention extends to the appended claims and equivalents thereof.

As will be further appreciated, the processes in the described embodiments can be implemented using any combination of software, firmware or hardware. While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the embodiments without departing from the essential scope thereof. Therefore, it is intended that the invention not be limited to the particular embodiments disclosed, but will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments has been presented for purposes of illustration and description, but is not intended to be exhaustive or limited to the form disclosed. Many modifications and variations will be apparent to those of ordinary skill in the art without departing from the scope and spirit of the overall disclosure. The embodiments were chosen and described in order to best explain the principles of the disclosure and the practical application, and to enable others of ordinary skill in the art to understand the invention for various embodiments with various modifications as are suited to the particular use contemplated.

What is claimed is:

1. A method implemented in an electronic device, the method comprising:
    in response to detecting a connection of pins of a device universal serial bus (USB) connector to corresponding pins of a USB connector of an accessory, configuring an accessory usage setting of the electronic device to correspond to the accessory being in a first operational mode of a plurality of operational modes;
    in response to a request to change an operational mode of the accessory to a second operational mode among one or more alternate operational modes of the plurality of operational modes:
        generating a voltage level change on a first signal line corresponding to a single pin of the USB pins of the device's USB connector to communicate to the accessory that a change in a present operational mode of the accessory is being initiated; and
        modifying the accessory usage setting of the electronic device when the accessory is in the second operational mode, to enable the electronic device to utilize one or more functional features associated with the second operational mode of the accessory.

2. The method of claim 1, wherein modifying the accessory usage setting of the electronic device comprises:
    communicating, to the accessory, mode identifying information corresponding to the second operational mode to trigger the accessory to change to the second operational mode when the voltage level change is detected by the accessory, wherein the accessory is designed to automatically change from the first operational mode to the second operational mode indicated by the received mode identifying information.

3. The method of claim 2, further comprising:
    receiving from the accessory information identifying which operational modes of the plurality of operational modes are supported by the accessory;
    assigning a unique data value to each operational mode of the accessory; and
    transmitting to the accessory, via signal and communication lines, the unique data value corresponding to the operational mode desired to be activated at the accessory, wherein the unique data value is transmitted to the accessory before generating the voltage level change to communicate to the accessory that a change in a present operating mode is being triggered.

4. The method of claim 3, further comprising activating switching between the first operational mode and each of the plurality of alternate operational modes by first transmitting to the accessory unique data identifying a desired next operational mode from among the first operational mode and the plurality of alternate operational modes and then generating a next voltage level change on the first signal line.

5. The method of claim 1, wherein prior to configuring the accessory usage setting of the electronic device, the method comprises:
    instantiating an authentication and configuration protocol on the electronic device to authenticate the accessory;
    receiving, via signal and communication lines established via connection of pins of the device USB connector and a USB connector of the accessory, one or more types of information during authentication of the accessory, which one or more types of information identifies to the electronic device the one or more alternate operational modes of the accessory corresponding to one or more functional features of the accessory;
    wherein the first operational mode is a standard, default mode providing universal asynchronous receiver/transmitter (UART) on USB communication pins of the USB receiving connector; and
    wherein instantiating the authentication protocol and setting the accessory to a first operational mode comprises:
        first authenticating the accessory as a valid device for connecting to the electronic device by receiving authentication information from the accessory and comparing the authentication information with pre-established authentication parameters of valid devices; and enabling the accessory to be utilized with the electronic device only following successful authentication of the accessory.

6. The method of claim 5, wherein:

the USB receiving connector comprises (1) a first pin that is configured as an identifier (ID) line when coupled to a corresponding pin of a USB connector of a connected second device and (2) a plurality of second pins configured as transmit and receive signal lines for data communication/exchange with the connected second device; and generating a voltage level change on a first signal line comprises changing a voltage magnitude of a voltage provided on the ID line relative to a first threshold voltage, wherein the change in voltage magnitude indicates to the accessory that a change in operational mode is desired.

7. The method of claim 6, wherein the voltage is a direct current (DC) voltage and the method comprises:

when the first threshold voltage is a high threshold voltage, changing a voltage magnitude on the ID line comprises changing the voltage magnitude to a value above the high threshold voltage to signal the change in operational mode to the accessory; and when the first threshold voltage is a low threshold voltage, changing a voltage magnitude on the ID line comprises changing the voltage magnitude to a value below the low threshold voltage to signal the change in operational mode to the accessory.

8. The method of claim 6, wherein the electronic device comprises a first pull-up resistor and a second pull-up resistor both coupled to the ID line, and changing the voltage magnitude provided on the ID line comprises selecting from among the first pull-up resistor and the second pull-up resistor to effect a change in the voltage magnitude on the ID line from a first voltage value to a second voltage value at which the voltage level change is generated on the ID line.

9. The method of claim 1, further comprising:

detecting a return pulse on the first signal line from the accessory; and in response to detecting the return pulse, automatically polling the accessory for information that indicates what change has occurred in available functional features of the accessory in a present operational mode of the accessory; and modifying an operational mode of one or more of the electronic device and the accessory based on the change identified during said polling with the available functional features of the accessory.

10. The method of claim 1, wherein the electronic device is a mobile phone and the accessory is a mobile phone docking device.

11. An electronic device comprising:

a processor;

a universal serial bus (USB) connector coupled to the processor that operates as a connecting and communication port to enable connection of the electronic device to a universal serial bus (USB) receiving connector of an accessory device;

a memory component coupled to the processor and having stored thereon data identifying a plurality of operational modes that can be utilized with a USB-connected accessory device;

an accessory authentication, configuration and mode selection (AACMS) mechanism including configuration and operational mode selection (COMS) logic that performs the functions of:

in response to a request to change an operational mode of the accessory to a second operational mode among the plurality of operational modes:

generates a voltage level change on a first signal line corresponding to a single pin of the USB pins of the electronic device's USB connector to communicate to the accessory that a change in a present operational mode of the accessory is being initiated; and modifies an accessory usage setting of the electronic device, relative to functional operation of the accessory when the accessory is in the second operational mode, to enable the electronic device to utilize one or more functional features associated with the second operational mode of the accessory.

12. The electronic device of claim 11, wherein the COMS logic changes the accessory usage setting of the electronic device, relative to functional operation of the accessory in the second operational mode by communicating, to the accessory, mode identifying information corresponding to the second operational mode to trigger the accessory to change to the second operational mode when the voltage level change is detected by the accessory, wherein the accessory is designed to automatically change from the present operational mode to the operational mode indicated by the received mode identifying information.

13. The electronic device of claim 12, wherein the COMS logic further:

determines from the received one or more types of information identifying one or more alternate operational modes of the accessory that the accessory supports a plurality of different alternate operational modes;

assigns a unique data value to each operating mode to enable each operational mode to be uniquely identifiable; and transmits to the accessory, via the signal and communication lines, the unique data value corresponding to the operational mode desired to be activated at the accessory, wherein the unique data value is transmitted before generating a voltage level change to communicate to the accessory that a change in a present operating mode is being triggered.

14. The electronic device of claim 12, wherein the coms logic further activates switching between the first operational mode and each of the plurality of alternate operational modes and switching between each of the plurality of alternate operational modes by first transmitting to the accessory unique data identifying a desired next operational mode from among the first operational mode and the plurality of alternate operational modes and then generating a next voltage level change on the first signal line.

15. The electronic device of claim 11, wherein:

the first operational mode is a standard, default mode providing universal asynchronous receiver/transmitter (UART) communications over communication pins of the USB receiving connector; and the COMS logic instantiates the authentication protocol and sets the accessory to a first operational mode by:

first authenticating the accessory as a valid device for connecting to the electronic device by receiving authentication information from the accessory and comparing the authentication information with pre-established authentication parameters of valid devices; and enabling the accessory to be utilized with the electronic device only after successful authentication of the accessory.

16. The electronic device of claim 15, wherein:
the USB connector comprises a first pin that is configured as an identifier (ID) line when coupled to a corresponding pin of a USB connector of a connected accessory device and a plurality of second pins configured as transmit and receive signal lines for data communication/exchange with the connected accessory device;
wherein the voltage is a direct current (DC) voltage;
the COMS logic generates a voltage level change on a first signal line by triggering a change in a voltage magnitude on the id line relative to a first threshold voltage, wherein the change in voltage magnitude indicates to the accessory that a change in operational mode is desired;
when the first threshold voltage is a high threshold voltage, the COMS logic triggers the change in a voltage magnitude on the ID line by changing the voltage magnitude to a value above the high threshold voltage to signal the change in operational mode to the accessory; and
when the first threshold voltage is a low threshold voltage, the COMS logic triggers the change a voltage magnitude on the ID line by changing the voltage magnitude to a value below the low threshold voltage to signal the change in operational mode to the accessory.

17. The electronic device of claim 16, further comprising a first pull-up resistor and a second pull-up resistor both coupled to the ID line, and the COMS logic triggers the change of the voltage magnitude on the ID line by selecting from among the first pull-up resistor and the second pull-up resistor to cause a change in the voltage magnitude on the ID line from a first voltage value to a second voltage value at which the voltage level change is generated on the ID line.

18. The electronic device of claim 11, wherein further the COMS logic:
detects a return pulse on the first signal line from the accessory; and
in response to detecting the return pulse, automatically polls the accessory for information that indicates what change has occurred in available functional features of the accessory in a present operational mode of the accessory; and
modifies an operational mode of at least one of the electronic device and the accessory based on the change identified with the available functional features of the accessory.

19. An accessory for use with an electronic device comprising:
a universal serial bus (USB) receiving connector;
an integrated circuit (IC) electrically coupled to the USB connector, wherein the IC comprises authentication information of the accessory and one or more types of information that identifies to a connected electronic device one or more alternate operational modes of the accessory corresponding to one or more functional features of the accessory;
logic associated with the IC that responsive to detection of a connection to the electronic device via the USB connector, transmits to the electronic device, via one or more signal and communication lines established over the connection of pins of a USB connector of the electronic device with pins of the USB receiving connector, one or more types of information that identifies the one or more alternate operational modes supported by the accessory; and
operational mode switching (OMS) logic that, in response to detecting a voltage level change on an identifier (ID) line corresponding to a single pin of the pins of the USB receiving connector from the electronic device, identifies a next operational mode from a current operational mode in which the accessory is operating, changes to the next operational mode and activates features of the accessory associated with the next operational mode.

20. The accessory of claim 19, further comprising:
the OMS logic detects a current unavailability of one or more features that are supposed to be available in a current operational mode of the accessory; and
in response to the detection, the OMS logic generates and transmits a pulse or a change in voltage level on the ID line to signal to the electronic device that a negative change has occurred in the features that are currently available on the accessory.

* * * * *